E. L. Perry
Horse Cover.
Nº 44,654.    Patented Oct. 11, 1864.
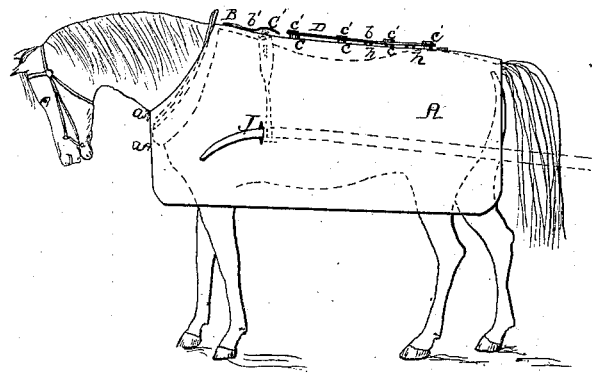
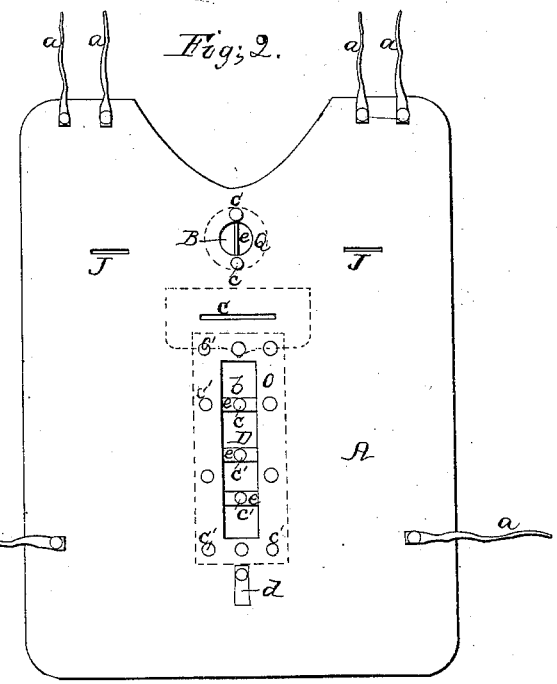
Witnesses:
Inventor:
Edward L. Perry

UNITED STATES PATENT OFFICE.

E. L. PERRY, OF NEW YORK, N. Y.

HORSE-COVER.

Specification forming part of Letters Patent No. 44,654, dated October 11, 1864.

*To all whom it may concern:*

Be it known that I, E. L. PERRY, of the city, county, and State of New York, have invented a new and useful Improvement in Horse-Covers; and I do hereby declare that the following is a full, clear, and exact description thereof, which will enable those skilled in the art to make and use the same, reference being had to the accompanying drawings, forming part of this specification, in which—

Figure 1 represents a side view of my horse-cover when in use on the back of the animal. Fig. 2 is an inside view of the cover when spread out. Fig. 3 is a sectional view of one of the rivets which secure the ventilating louvers to the cover.

Similar letters of reference indicate corresponding parts.

Attempts have been made to produce covers for the protection of horses from snow, rain, sleet, and other inclemencies of the weather when they are in harness and at work, or are kept standing exposed to the weather ready for service. Water-proof covers have been considered the best for this purpose, but they are now generally rejected because that quality which constitutes their chief value—to wit, the power to resist moisture—also prevents ventilation and the escape of moisture through them. The action of water-proof covers—such as are made of rubber and gutta-percha and their compounds, or of other water-proof compositions—is as follows: The evaporation of moisture from the body of the animal, which is more or less, according to the exercise he is undergoing and according to the varying temperature at different hours of the day, goes on the more readily because the heat is confined beneath the cover, and the circulation of air over and next to the body of the animal is prevented. The vapor thus created rises against the cover, and is confined in the space inclosed between the back and the loins of the animal on the highest part of the cover. He thus becomes more and more heated by means of the covering. When his labor is over, the vapor thus collected will condense and cover him with moisture of a low temperature. The excessive perspiration caused by the absence of circulation and ventilation weakens the animal and makes him more and more sensitive to changes of temperature, while the condensation of the confined vapor causes a stream of cold water to run down upon his back and loins, and the animal "takes cold" and falls sick.

My object is to produce a ventilating water-proof cover for horses and other animals, which may be used as well in warm weather as in cold, with like beneficial results. I accomplish this by means of ventilators or louvers D and B, hereinafter described.

A is a horse-cover, made in this example of my invention of gutta-percha cloth. It is provided with straps $a$, which are to be tied or buckled over the harness upon which the cover may be spread. It is also provided with shaft-holes J and with an opening, C, which fits over the saddle-mountings. The opening C is covered with a flap, C', to prevent the entrance of rain. A loop or strap, $d$, is also provided at the hinder part of the cover to attach it to the tail-strap or other convenient part of the harness.

The louver D is made as follows: I make an opening O in the center of the width of the cover extending between the strap $d$ and the saddle-opening C. This opening is of the shape of a parallelogram in the cover here shown, but it may be of any other suitable shape, and its length should be such as to reach from the saddle, or from near the shoulder of the horse, to the highest point of the hip, or rather to that point where the back-strap of the harness rests on his back, so as to extend over the hollow of his back. The sides of the openings O are connected by three or more straps, $e$, to prevent them from being stretched too far asunder.

$b$ is a water-proof roof of the size indicated in dotted outline in Fig. 2, which is attached to the cover A by means of rivets $c'$. The bodies of the rivets between their flattened heads are surrounded by elastic rings $c$, which separate the cover A and the roof $b$, or rather sustain the roof above the cover, in the manner shown in Fig. 1. These rivets and rings are to be sufficiently numerous to effect this purpose, so that the roof shall always be kept elevated above and out of contact with the cover. Like rivets $c'$ are attached to the straps $e$ in the center of their length. They likewise have elastic rings (marked $h$) around their bodies. These rivets on the straps do not extend through the roof $b$, but they are headed down upon the elastic rings $h$, and they serve to support the roof $b$ along the line of its center.

The louver B is made as follows: Q is a circular opening made between the opening $c$ and the front end of the cover, which is traversed by a strap, $e$, to hold its sides from stretching too far asunder. This opening Q is also covered by a roof $b'$, which is connected to the cover by rivets $c'$, and sustained above it by elastic rings $c$ in the same manner as the roof $b$. The louver B, it will be seen, covers the shoulder of the horse between the collar and the saddle.

The operation of my ventilating cover is as follows: The cover having been properly secured over the harness, with the top resting on the back-strap, as shown in Fig. 1, the vapor proceeding from the body of the horse rises over his back and passes off through the louvers B and D, which are always open, as seen in Fig. 1, so as to permit a free circulation of air from without and from within the cover. The collection of vapor above the horse's back and the deposition and condensation of moisture are therefore prevented.

It will be observed that the louvers B and D are each open and elevated above the cover A all around their sides, so that the circulation is free in every direction; but this may be varied in practice, according to the degree of ventilation and circulation desired. The openings may be, for instance, made to vary in size or in position to suit animals of different temperaments, or different climates, or different seasons of the year.

The louvers may be of many different patterns. They may be closed at the sides and open only at their ends, or vice versa, and they may be varied otherwise to suit the taste or convenience of the maker.

This principle of ventilation may be applied to any other kind of cover beside water-proof covers, and to covers for other animals besides horses.

The roofs of the louvers need not be supported upon the cover in a flat or horizontal position, as shown in this example of my invention, but they may be bent in the form of a roof of a house, so as to leave openings for ventilation only at their ends, while their sides may be secured to the cover by cementing or by other modes of attachment, or the louvers may be secured and sustained by other means than by rivets. These and other possible modifications of form and construction of my invention will be embraced within the principle thereof. The cover and the louvers may be of any suitable material.

I claim as new and desire to secure by Letters Patent—

1. A cover for horses and other animals, constructed so as to permit the circulation of air through the same and between it and the body of the animal, substantially as and for the purpose above described.

2. Making a ventilating cover for horses and other animals by means of louvers B and D, or either of them, constructed and applied substantially as above described.

3. Supporting the roof of the louver over the openings in the cover and clear from the cover by means of rivets and elastic or other rings fast on the rivet-bodies, or of other fastenings or modes of attachment, substantially as described.

EDWARD L. PERRY.

Witnesses:
M. M. LIVINGSTON,
WM. F. MCNAMARA.